United States Patent [19]

Muto et al.

[11] Patent Number: 4,802,711
[45] Date of Patent: Feb. 7, 1989

[54] ANTI-LOCK CONTROL METHOD FOR VEHICLE

[75] Inventors: Tetsuji Muto; Shohei Matsuda; Yoshihiro Iwagawa; Toshio Yahagi, all of Tochigi, Japan

[73] Assignee: Honda Giken Kogyo Kabushiki Kaisha, Tokyo, Japan

[21] Appl. No.: 148,674

[22] Filed: Jan. 26, 1988

[30] Foreign Application Priority Data

Jan. 26, 1987 [JP] Japan .................. 62-15474

[51] Int. Cl.$^4$ .................. B60T 8/66; B60T 8/70
[52] U.S. Cl. .................. 303/96; 303/98; 303/109; 364/426.02
[58] Field of Search .................. 303/96, 98, 94, 100, 303/111, 109, 102–108, 20, 110, 97, 95, 113–119; 364/426

[56] References Cited

U.S. PATENT DOCUMENTS

| | | | |
|---|---|---|---|
| 3,870,378 | 3/1975 | Carp | 303/96 |
| 3,909,070 | 9/1975 | Leiber | 303/109 |
| 3,980,346 | 9/1976 | Leiber | 303/100 X |
| 4,005,910 | 2/1977 | Leiber et al. | 303/96 |
| 4,036,536 | 7/1977 | Quon | 303/97 X |
| 4,164,360 | 8/1979 | Jones | 303/110 |
| 4,191,430 | 3/1980 | Schirmer | 303/109 |
| 4,219,244 | 8/1980 | Griner et al. | 303/97 X |
| 4,266,833 | 5/1981 | Sato et al. | 303/106 |
| 4,320,459 | 3/1982 | Lindemann et al. | 303/111 X |
| 4,321,676 | 3/1982 | Ohmori et al. | 303/109 X |
| 4,374,421 | 2/1983 | Leiber | 303/111 X |
| 4,446,522 | 5/1984 | Sato et al. | 303/106 X |
| 4,451,096 | 5/1984 | Gygax | 303/111 X |
| 4,576,419 | 3/1986 | Leiber | 303/111 X |
| 4,593,955 | 6/1986 | Leiber | 303/111 X |
| 4,652,060 | 3/1987 | Miyake | 303/96 |
| 4,657,314 | 4/1987 | Leiber | 303/96 X |
| 4,673,226 | 6/1987 | Every et al. | 303/109 |
| 4,717,209 | 1/1988 | Hagiya et al. | 303/110 X |
| 4,718,735 | 1/1988 | Ogino | 303/98 X |

Primary Examiner—Douglas C. Butler
Attorney, Agent, or Firm—Lyon & Lyon

[57] ABSTRACT

A signal value on the basis of a lower wheel speed is compared with a signal value on the basis of a high wheel speed and, when the difference therebetween is larger than a predetermined value, a higher vehicle speed of two previously estimated vehicle speeds is used for anti-lock control and a reference value with which a wheel speed will be compared is derived from such vehicle speed. Thus, a range of condition for judging that wheels of a vehicle are about to be locked is enlarged.

5 Claims, 5 Drawing Sheets

ANTI-LOCK CONTROL METHOD FOR VEHICLE

BACKGROUND OF THE INVENTION

1. FIELD OF THE INVENTION

The present invention relates to an anti-lock control method for vehicles including the steps of estimating a vehicle speed by integrating the speed of a wheel, comparing the wheel speed with a reference value derived from such an estimated vehicle speed to judge whether or not a wheel is going into a locked condition and, when it is judged that the wheel is entering a locked condition, reducing a braking pressure to a wheel brake.

2. DESCRIPTION OF THE PRIOR ART

Such a method has been known, for example, from Japanese patent publication No. 47010/1981.

When a vehicle is traveling on a low friction road surface, i.e., on a road surface which creates a low level of friction between wheels of vehicles, wheels of the vehicle tend to be locked. Therefore, during travel of the vehicle on such a low friction road surface, it is desirable that the anti-lock control be carried out earlier than usual. The present inventors have found that, during braking of a vehicle traveling on a low friction road surface, the difference between a plurality of wheel speeds becomes large.

SUMMARY OF THE INVENTION

The present invention has been accomplished with such circumstances in view, and it is an object of the present invention to provide an anti-lock control method for a vehicle, wherein the fact that the vehicle is traveling on a low friction road surface is detected from wheel speeds and the anti-lock control is carried out earlier than usual.

According to the present invention, when the difference between a signal value derived from a lower wheel speed and a signal value derived from a higher wheel speed is larger than a predetermined value, a range of condition for judging that wheels of the vehicle are about to be locked is enlarged.

By virtue of this arrangement in which the range of condition for judging that the wheels are about to be locked is enlarged when the difference between a signal value derived from a lower wheel speed and a signal value derived from a higher wheel speed is larger than a predetermined value, the anti-lock control can be carried out earlier than usual during travel of the vehicle on a low friction road surface.

The above and other objects, features and advantages of the invention will become apparent from reading of the following detailed description of preferred embodiments taken in conjunction with the accompanying drawings.

BRIEF DESCRIPTION OF THE DRAWINGS

FIGS. 1 to 3 illustrate one embodiment of the present invention, wherein

FIG. 1 is a diagram of a hydraulic control circuit;

FIG. 2 is a simplified circuit diagram showing the arrangement of a control means;

FIG. 3 is a block diagram of a circuit for computing a vehicle speed; and

DESCRIPTION OF THE PREFERRED EMBODIMENTS

Some embodiments of the invention will now be described hereinafter with reference to the attached drawings.

Figure 1:
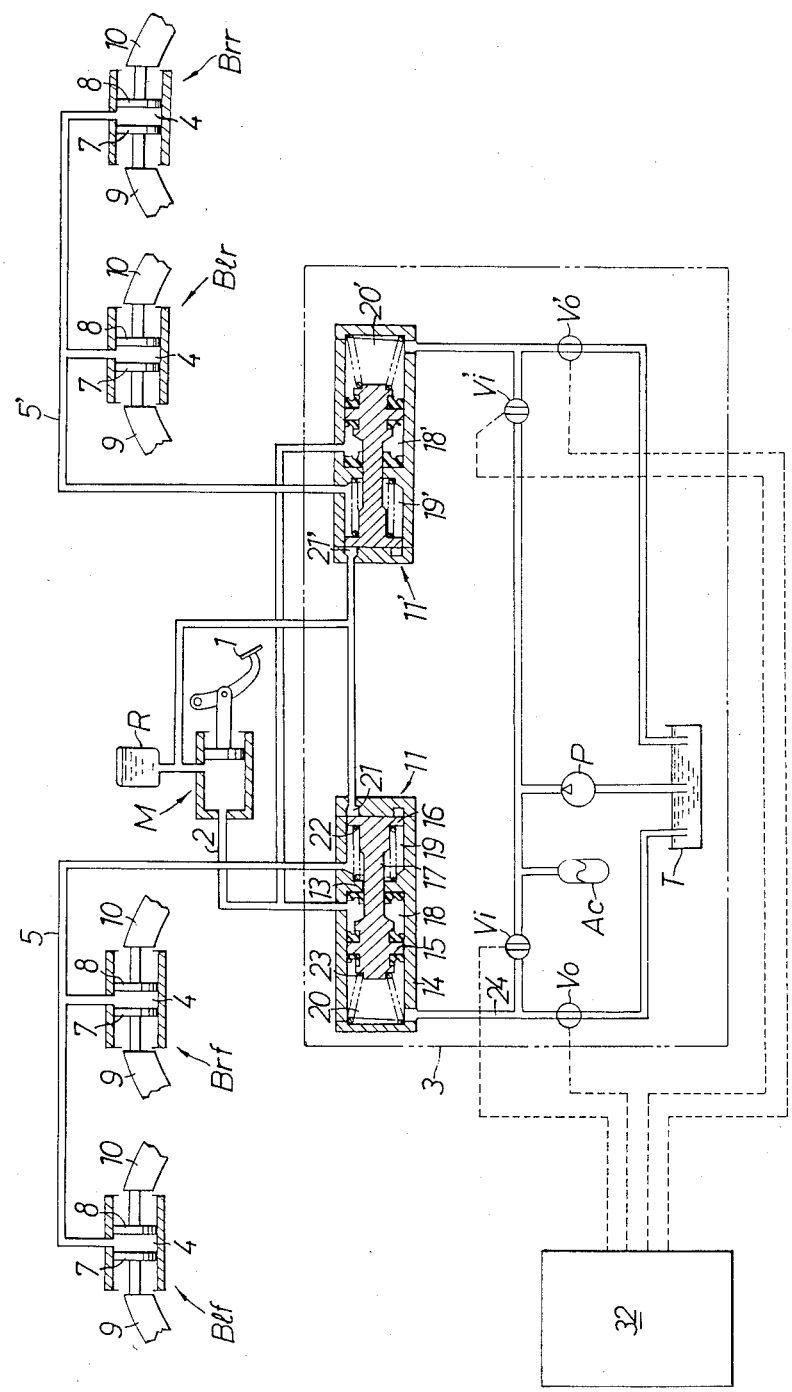
Figure 2:
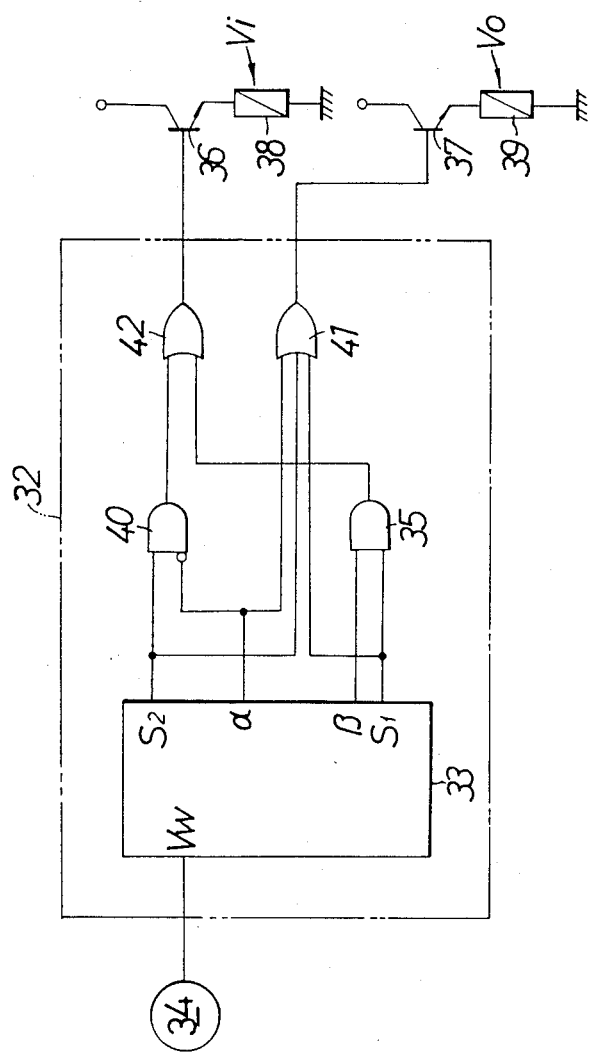
Figure 3:
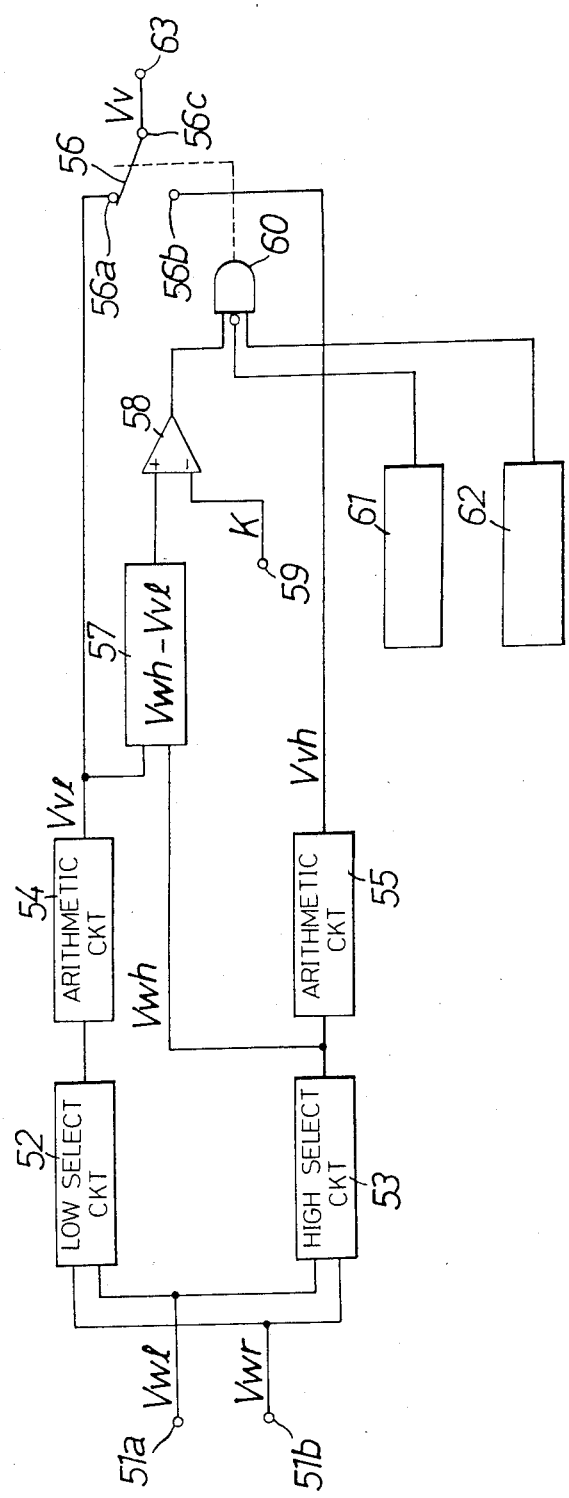

FIGS. 1 to 3 illustrate a first embodiment of the present invention. First referring to FIG. 1, a brake pedal 1 is operatively connected to a master cylinder M. When a driver depresses the brake pedal 1 down, the master cylinder M generates a hydraulic pressure in an oil passage 2. The oil passage 2 is connected to a hydraulic control circuit 3 which outputs a hydraulic brake pressure in response to the pressure generated in the oil passage 2.

A vehicle has left and right driving wheels and left and right follower wheels and wheel brakes are provided for respective driving and follower wheels. Hydraulic brake pressures outputted from the hydraulic control circuit 3 are supplied to the wheel brakes. When the vehicle is of a front wheel drive type, for example, its left and right front wheels are driving wheels and they are equipped with a left front wheel brake Blf and a right front wheel brake Brf, respectively. Left and right rear wheels of the vehicle, as follower wheels in this illustrated embodiment, are equipped with a left rear wheel brake Blr and a right rear wheel brake Brr, respectively. The brakes Blf, Brf, Blr and Brr are, for example, constructed into drum brakes. The left and right front wheel brakes Blf and Brf have respective brake chambers 4 which are connected to an oil passage 5 leading from the hydraulic control circuit 3 while the left and right rear wheel brakes Blr and Brr similarly have brake chambers 4 which are connected to an oil passage 5' leading from the hydraulic control circuit 3.

At respective brakes Blf, Brf, Blr and Brr, if hydraulic brake pressures are fed to their chambers 4, pistons 7 and 8 are actuated to move apart from each other urging brake shoes 9 and 10 into contact with a brake drum, not shown, thereby producing a brake torque. If the hydraulic brake pressure in the brake chamber 4 should go excessively high, the brake torque generated between the brake shoes 9, 10 and the brake drum will become too large, resulting in a locked condition of the associated wheel. In order to deal with this, when a wheel is going into a locked condition, the hydraulic control circuit 3 operates to reduce the hydraulic brake pressure whereby the wheel is prevented from being locked.

The hydraulic control circuit 3 includes a modulator 11 associated with the left and right front wheel brakes Blf and Brf and a modulator 11' associated with the left and right rear wheel brakes Blr and Brr and these modulators 11 and 11' have the basically same construction. Therefore, only one modulator 11 will be described its detailed construction in the following.

The modulator 11 comprises a cylinder 14 which has opposite end walls thereof closed and a hollow interior divided at its intermediate portion by a partition wall 13, and a rod 17 having a pair of pistons 15 and 16 formed at opposite ends thereof, the rod 17 having a portion intermediate between the pistons 15 and 16 which axially slidably penetrates through the partition wall 13. A cylinder chamber is defined between the partition wall 13 and one piston 15 to serve as a primary hydraulic brake pressure chamber 18 which is connected to the master cylinder M via the oil passage 2. Another cylinder chamber is defined between the partition wall 13 and the other piston 16, which serves as a secondary hydraulic brake pressure chamber 19 and is connected to the brake chambers 4, 4 of left and right front wheel brakes Blf and Brf through the oil passage 5. An anti-lock hydraulic control pressure chamber 20 is defined between one end wall of the cylinder 14 and the one piston 15 and an open chamber 21 is defined between the other end wall of the cylinder 14 and the other piston 16. The open chamber 21 is connected to a reservoir R of the master cylinder M. Housed in the secondary hydraulic brake pressure chamber 19 is a spring 22 which biases the piston 16 in a direction moving apart from the partition wall 13. In the anti-lock hydraulic control pressure chamber 20 is housed a spring 23 which biases the piston 15 toward the partition wall 13.

To the anti-lock hydraulic control pressure chamber 20 is connected an oil passage 24 which is connected via a normally-closed inlet valve Vi to an oil pump P and via a normally-open outlet valve Vo to an oil tank T. An accumulator Ac is connected to an oil passage between the inlet valve Vi and the oil tank T.

Similarly in the other modulator 11', a primary hydraulic brake pressure chamber 18' is connected to the master cylinder M and a secondary hydraulic brake pressure chamber 19' is connected to the brake chambers 4, 4 of left and right rear wheel brakes Blr and Brr via the oil passage 5'. An open chamber 21' is connected to the reservoir R. Furthermore, an anti-lock hydraulic control pressure chamber 20' is connected via a normally-closed inlet valve Vi' to the oil pump P and via a normally-open outlet valve Vo' to the oil tank T.

The inlet valves Vi, Vi' and the outlet valves Vo, Vo' are solenoid valves and are opened and closed under control of a control means 32.

In a state where the inlet valves Vi, Vi' are closed and the outlet valves Vo, Vo' are open, the interiors of anti-lock hydraulic control pressure chambers 20, 20' are released to the oil tank T. If the brake pedal 1 depressed down and the hydraulic pressure from the master cylinder M is supplied into the primary hydraulic brake pressure chambers 18, 18' in this state, the volumes of secondary hydraulic brake pressure chambers 19, 19' are reduced to feed into the brake chambers 4, 4.. of respective brakes Blf, Brf, Blr and Brr the hydraulic brake pressures proportional inlevel to the pressure generated from the master cylinder M. Accordingly, the torque generated at the time of braking can freely increase in response to the braking operation of a driver.

Now if the outlet valves Vo, Vo' are closed with the inlet valves Vi, Vi' being held closed, the control oil within the anti-lock hydraulic control pressure chambers 20, 20' becomes confined therein so that the secondary hydraulic brake pressure chambers 19, 19' of respective modulators 11, 11' are kept their volumes invariable irrespective of increase or decrease in the hydraulic pressures fed to the primary hydraulic brake pressure chambers 18, 18'. As a consequence, the braking torque is maintained at a constant level without being affected by the braking operation of a driver. This operation applies to the case where the possibility of a wheel locking arises.

Furthermore, if the inlet valves Vi, Vi' are opened and the outlet valves Vo, Vo' are closed, anti-lock hydraulic control pressures are supplied to the anti-lock hydraulic control pressure chambers 20, 20'. Owing to these pressures, irrespective of the hydraulic pressure from the master cylinder M prevailing the primary hydraulic brake pressure chambers 18, 18', the volumes of the secondary hydraulic brake pressure chambers 19, 19' increase to reduce the pressures within the brake chambers 4 . . . of respective wheel brakes Blf, Brf, Blr and Brr, thus weakening the braking torque. Accordingly, by opening the inlet valves Vi, Vi' and closing the outlet valves Vo, Vo' when a wheel is on the way to locking, the wheel can be avoided from entering a state of locking.

Referring to FIG. 2, the basic arrangement of the control means 32 will be described below. Since the construction for controlling one inlet valve Vi and one outlet valve Vo which are associated with one pair of wheel brakes Blf and Brf is basically the same as that for controlling the other inlet valve Vi' and outlet valve Vo' associated with the other pair of wheel brakes Blr and Brr, the construction for controlling the one valves Vi and Vo will be described only in the following.

The control means 32 includes a decision circuit 33 which is used to judge whether or not a wheel is in a locked state and, as a result of such judgment, to output signals for opening and closing the inlet valve Vi and the outlet valve Vo.

It should be noted here that the establishment of the following conditions (a) and (b) may operate the control means 32 so as to judge that a wheel is entering a locked state and cause a brake pressure to be reduced:

(a) a wheel acceleration $\dot{V}w$ < a reference wheel deceleration $-\dot{V}wo$;

(b) a wheel speed $Vw$ < a first reference wheel speed $Vr_1$.

When assuming that a vehicle speed is identified by $Vv$ and a reference slip rate for a wheel by $\lambda_1$, the relationship of $Vr_1 = Vv \cdot (1-\lambda_1)$ is obtained. Therefore, if a slip rate of the wheel is identified by $\lambda$, the above relationship of $Vw < Vr_1$ has the same meaning as $\lambda > \lambda_1$.

The decision circuit 33 is inputted from a wheel speed detector 34 with a signal indicative of the wheel speed $Vw$. When the condition $\dot{V}w < -\dot{V}wo$ is satisfied, the decision circuit 33 outputs a signal $\beta$ and when the condition $Vw < Vr_1$ is satisfied, it outputs a signal $S_1$.

These signals $\beta$ and $S_1$ are inputted to an AND gate 35 and when both signals become high in level, a transistor 36 is conducted and a solenoid 38 is energized thereby opening the inlet valve Vi. Outputting the signal S of a high level also causes a transistor 37 to be conducted and a solenoid 39 to be energized so that the outlet valve Vo is closed.

When the signals $\beta$ and $S_1$ are generated so as to reduce or weaken the brake torque in the afore-mentioned manner, the wheel speed is on the way to reduction. This means that the braking torque is still larger than the driving torque given from the road surface and therefore that the fear of wheel locking has not been eliminated completely at this stage. Though this control system can normally provide a good result because of some time delay, such as 10 ms, appearing in operation of the system which would cause the brake pressure to be reduced further after falling of such brake pressure-reducing signals, there may be, however, expected another possibility that the degree of reduction of the brake pressure has been insufficient for some reason, for example, due to road conditions and the wheel speed may continue to show a locking tendency. In order to overcome this problem, it can be arranged to output a brake pressure-reducing signal continuously until the wheel speed $Vw$ surely changes into an increasing phase as far as the condition $\lambda > \lambda_1$ is present. In this case, however, the brake pressure-reducing signal is kept valid until a condition of $\dot{V}w > 0$ is obtained, in spite of the fact that a good control effect is normally achieved even if the output of such brake pressure-reducing signal is stopped at the instant of $\dot{V}w > -\dot{V}wo$. This poses a disadvantage that the brake torque may be reduced excessively, though this problematic aspect can be disregarded in practical use for the wheels that are subject to a smaller part of distribution of the braking load.

In view of these, there is further set a second reference wheel speed $Vr_2$ which corresponds to a second reference slip rate $\lambda_2$ having a relationship of $\lambda_2 > \lambda_1$ and it is proposed to output the brake pressure-reducing signal until the wheel speed $Vw$ changes into an increasing phase but only in the presence of a condition of $Vw < Vr_2$ or $\lambda > \lambda_2$ indicating a high possibility of wheel locking. In other words, the decision circuit 33 judges whether or not the condition $Vw < Vr_2$ or $\lambda > \lambda_2$ is satisfied and when it is satisfied, the circuit 33 outputs a signal $S_2$. Also, a reference wheel acceleration $+\dot{V}wo$ is set to judge whether the wheel speed $Vw$ is increasing or not and if $\dot{V}w > +\dot{V}wo$, the circuit 33 outputs a signal $\alpha$.

The signal $S_2$ is inputted to one input terminal of an AND gate 40 and also to an OR gate 41. The signal $\alpha$ is inputted to the OR gate 41 and in an inverted manner to the AND gate 40. The signal $S_1$ is also inputted to the OR gate 41 of which output is in turn fed to the base of transistor 37. Outputs of both AND gates 35 and 40 are inputted to an OR gate 42 which then outputs a signal to the base of transistor 36.

With the control means 32 constructed above, if either of the signals $S_1$, $\alpha$ and $S_2$ becomes high, the transistor 37 is conducted and the outlet valve $Vo$ is closed. If the signals $\beta$ and $S_1$ are both high or if the signal $S_2$ is high and simultaneously the signal $\alpha$ is low, the inlet valve $Vi$ is made open.

Next explanation will be made as to how the first and second reference wheel speeds $Vr_1$ and $Vr_2$ are set. These are ideally determined by detecting a vehicle speed $V$ and incorporating the reference slip rates $\lambda_1$ and $\lambda_2$ into the value of vehicle speed $V$ while using the following equations:

$$Vr_1 = V(1-\lambda_1) \quad (1)$$

$$Vr_2 = V(1-\lambda_2) \quad (2)$$

However, no practical means has been provided heretofore to detect the vehicle speed $V$ and therefore, a provisional vehicle speed $Vv$ is obtained by a circuit shown in FIG. 3.

Referring to FIG. 3, speeds of a plurality of wheels, for example, wheel speeds $Vwl$ and $Vwr$ of left and right rear wheels are inputted respectively into a pair of input terminals 51a and 51b, and both these wheel speeds $Vwl$ and $Vwr$ are inputted into a low select circuit 52 and a high select circuit 53. The low select circuit 52 selects the lower wheel speed of these wheel speeds $Vwl$ and $Vwr$, while the high select circuit 53 selects the higher wheel speed of these wheel speeds $Vwl$ and $Vwr$.

The wheel speed selected by the low select circuit 52 is inputted into an arithmetic circuit 54, while the wheel speed selected by the high select circuit 53 is inputted into another arithmetic circuit 55. The arithmetic circuits 54 and 55 are each provided with an integrator to estimate a vehicle speed by integrating an inputted wheel speed. That is, in one 54 of the arithmetic circuits, a vehicle speed $Vvl$ is estimated on the basis of the wheel speed selected by the low select circuit 52, while, in the other arithmetic circuit 55, a vehicle speed $Vvh$ is estimated on the basis of the wheel speed selected by the high select circuit 53.

The one arithmetic circuit 54 is connected to one separate contact 56a of a change-over switch 56 and also to a subtracter 57. The other arithmetic circuit 55 is connected to the other separate contact 56b of the change-over switch 56.

The subtracter 57 is supplied with, in addition to the vehicle speed $Vvl$ estimated by the one arithmetic circuit 54, a wheel speed $Vwh$ selected by the high select circuit 53. In the subtracter 57, a calculation $(Vwh - Vvl)$ is performed, and the result of this calculation in the subtracter 57 is inputted into a non-inverted input terminal of a comparator 58. On the other hand, a signal corresponding to a reference value K, for example, 5 km/h, is inputted from a reference value input terminal 59 to an inverted input terminal of the comparator 58. Thus, the comparator 58 outputs a signal at a high level when the result of calculation in the subtracter 57 is larger than the reference value K.

An output of the comparator 58 is inputted into one terminal of an AND gate 60. The remaining terminals of the AND gate 60 are supplied respectively with an inverted signal from anti-lock operation detecting means 61 which outputs a signal at a high level when the hydraulic pressure control circuit 3 is performing an anti-lock operation, and with a signal from vehicle speed limiting means 62 which outputs a signal at a high level when the vehicle speed indicated by a speedometer is above, for instance, 30 km/h. Therefore, the AND gate 60 outputs a signal at a high level in response to the output of the comparator 58 going into a high level, when the hydraulic pressure control circuit 3 is not performing any anti-lock operation and, simultaneously, the speedometer indicates a vehicle speed above 30 km/h.

The change-over switch 56 changes the contact/non-contact state of a common contact 56c thereof with respect to the pair of separate contacts 56a and 56b in accordance with the output of the AND gate 60. More specifically, when the output of the AND gate 60 is at a low level, the common contact 56c is kept in contact with one separate contact 56a, whereas the output of the AND gate 60 goes into a high level, the common contact 56c is brought into contact with the other separate contact 56b. The common contact 56c is connected to an output terminal 63, so that either one of the vehicle speeds $Vvl$ and $Vvh$, which have been estimated by the arithmetic circuits 54 and 55, is outputted from the output terminal 63 in accordance with the operating condition of the change-over switch 56, as a provisional vehicle speed $Vv$. This provisional vehicle speed $Vv$ is used as a vehicle speed $V$ to calculate the first and second reference wheel speeds $Vr_1$ and $Vr_2$, from the above-stated equations (1) and (2).

The operation of this embodiment will now be described. During travel of the vehicle on a normal road surface, when the brake pedal 1 is depressed to brake the vehicle, the difference between the wheel speeds $Vwl$ and $Vwr$ is small. Accordingly, the result of the calculation performed by the subtracter 57, i.e., the difference between a high wheel speed $Vwh$ and an estimated vehicle speed $Vvl$ on the basis of a low wheel speed is small. Consequently, an output of the comparator 58 is at a low level, resulting in a switching condition of the change-over switch 56 where the commone contact 56c is connected to the separate contact 56a. With this condition, the estimated vehicle speed Vvl on the basis of the low wheel speed is outputted from the output terminal 63 as a vehicle speed Vv, and first and second reference wheel speeds $Vr_1$ and $Vr_2$ are calculated from the estimated vehicle speed Vv. As a result, the reference wheel speeds $Vr_1$ and $Vr_2$ each become relatively small, thereby limiting conditions $Vw < Vr_1$ and $Vw > Vr_2$ to relatively narrow ranges.

When the vehicle is braked during travel on a low friction road surface, the difference between wheel speeds Vwl and Vwr is relatively large. Accordingly, the result of the calculation in the subtracter 57 becomes large, and, when this calculation result becomes larger than the reference value K, an output from the comparator 58 goes into a high level, judging that the vehicle is traveling on a low friction road surface. In this case, when an indicator of the speedometer indicates a vehicle speed of above 30 km/h and, simultaneously, the hydraulic control circuit 3 is not performing any anti-lock operation, an output from the AND gate 60 goes into a high level, whereby the change-over switch 56 changes its switching condition to one where the common contact 56c is in contact with the separate contact 56b. Consequently, an estimated vehicle speed Vvh derived from the higher wheel speed Vwh is outputted from the output terminal 63 as the vehicle speed Vv, thus setting reference wheel speeds $Vr_1$ and $Vr_2$ to larger values. As a result, the conditions $Vw < Vr_1$ and $Vw < Vr_2$ are expanded to relatively wider ranges, to relax the criterion of judging that the wheels are about to be locked, whereby the anti-lock control is carried out earlier than at a condition where the vehicle travels on a normal road surface.

Figure 4:
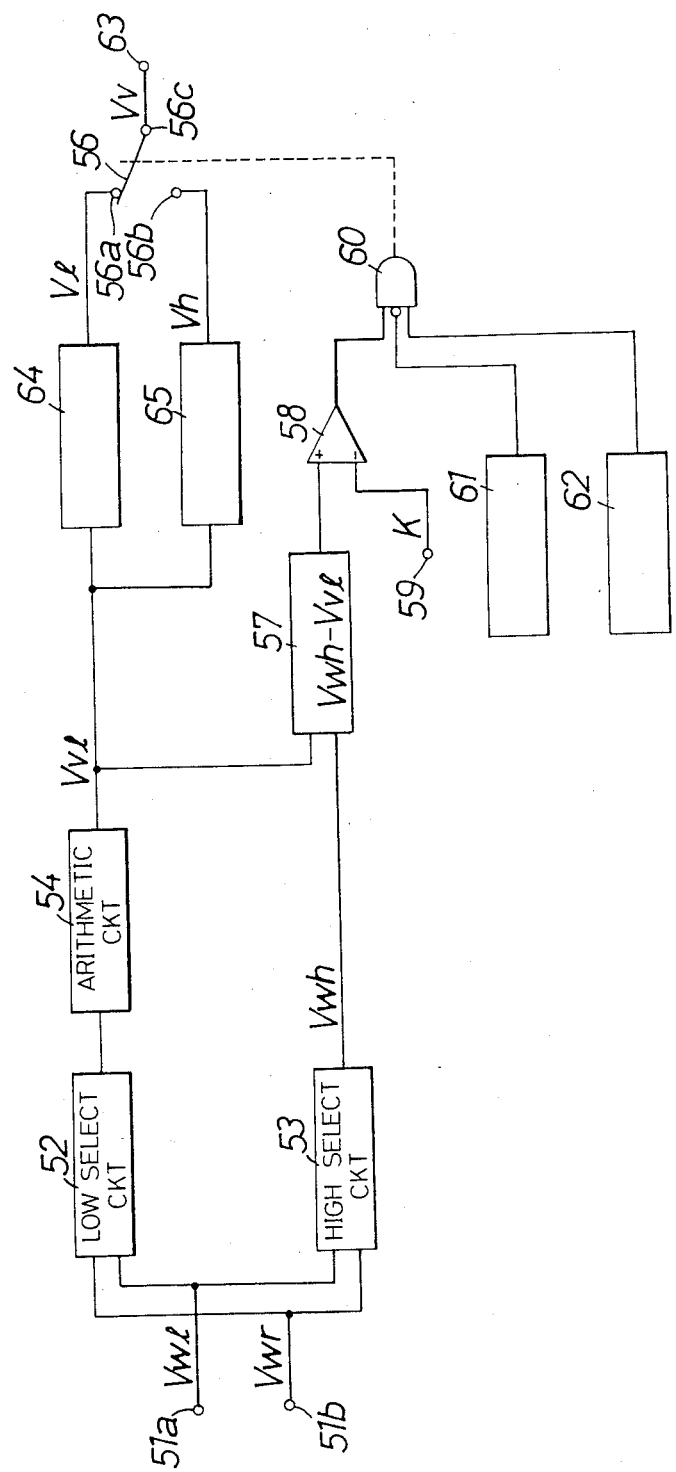
FIGS. 4 and 5 are block diagrams each corresponding to FIG. 3, which illustrate other embodiments of the present invention, respectively.

FIG. 4 illustrates another embodiment of the present invention. Components or parts corresponding to those in the previous embodiment are denoted by the same reference numerals.

An output of an arithmetic circuit 54 which has estimated a vehicle speed Vvl on the basis of a lower wheel speed is inputted respectively into a low speed setting circuit 64 and a high speed setting circuit 65. In these setting circuits 64 and 65, there are previously set a lower vehicle speed Vl and a higher vehicle speed Vh which are each proportionate to the inputted vehicle speed. The low speed setting circuit 64 is connected to one separate contact 56a of a change-over switch 56, while the high speed setting circuit 65 is connected to the other separate contact 56b of the change-over switch 56.

In this embodiment, when an output of an AND gate 60 goes into a high level during braking of a vehicle traveling on a low friction road surface, the vehicle speed Vh which has been set at a higher level is outputted from an output terminal 63 as a vehicle speed Vv, thereby relaxing a criterion of judging that the wheels are about to be locked.

Figure 5:
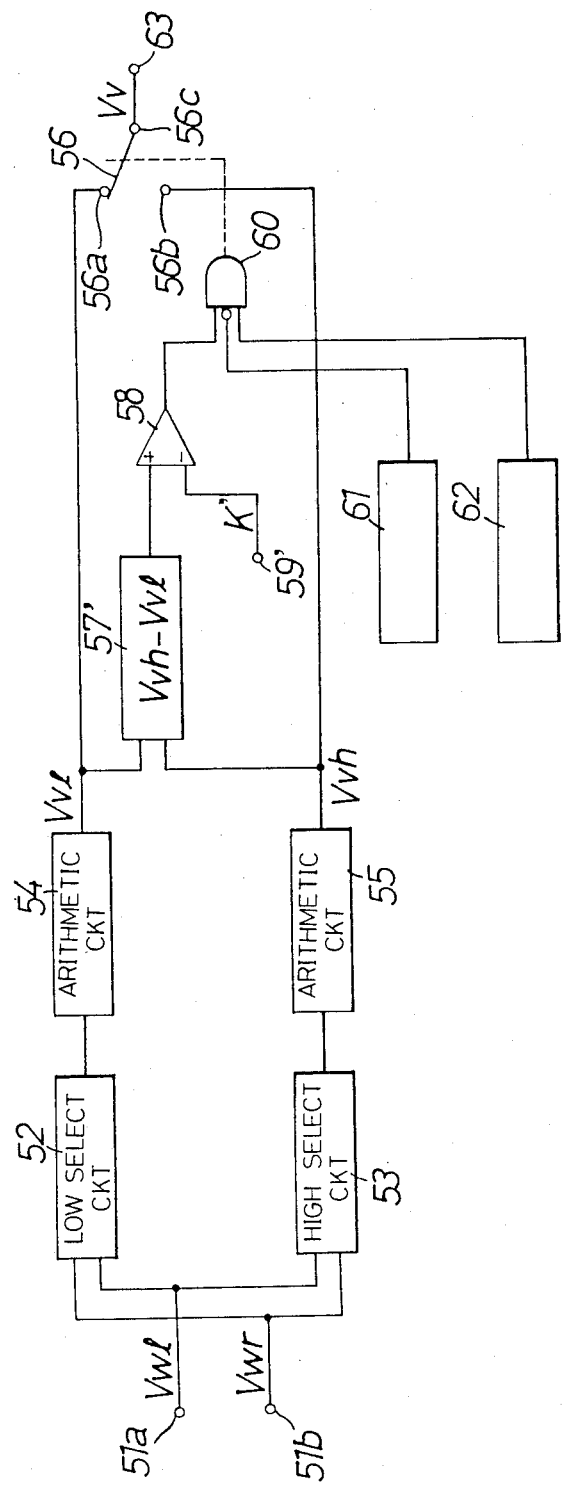

FIG. 5 illustrates a further embodiment of the present invention. In this embodiment, estimated vehicle speeds Vvl and Vvh which have respectively been computed by arithmetic circuits 54 and 55 are inputted into a subtracter 57' which calculates (Vvh−Vvl). When, in a comparator 58, the result of calculation (Vvh−Vvl) is larger than a reference value K' inputted from a reference value input terminal 59', the higher vehicle speed Vvh is used as an estimated vehicle speed Vv outputted from an output terminal 63, thereby relaxing a criterion of judging that the wheels are about to be locked.

Although in each of the foregoing embodiments the reference wheel speeds are determined through the detection of speeds of the rear wheels which are follower wheels, the reference wheel speeds may alternatively be based on the speeds of the front wheels which are driving wheels. Further, the arrangement may alternatively be such that the reference wheel speeds are determined from speeds of both driving and follower wheels.

What is claimed is:

1. An anti-lock control method for a vehicle comprising the steps of integrating wheel speeds to estimate a vehicle speed, comparing said wheel speeds with a reference value derived from said estimated vehicle speed to judge whether wheels are entering a locked state, and reducing a brake pressure to wheel brakes when said wheels are entering a locked state, wherein when a difference between a signal value derived from a lower one of the wheel speeds and a signal value derived from a higher one of the wheel speeds is larger than a predetermined value, a range of condition for judging that said wheels are about to be locked is enlarged.

2. An anti-lock control method for a vehicle according to claim 1, wherein, when the difference between said signal value derived from said lower wheel speed and said signal value derived from said higher wheel speed is larger than said predetermined value, said estimated vehicle speed is set at a higher level.

3. An anti-lock control method for a vehicle according to claim 1, wherein a first estimated vehicle speed is set from said lower wheel speed whereas a second estimated vehicle speed is set from said higher wheel speed and, when a difference between said higher wheel speed and said first estimated vehicle speed is smaller than said predetermined value, said first estimated vehicle speed is used for anti-lock control whereas when said difference is larger than said predetermined value, said second estimated vehicle speed is used for anti-lock control.

4. An anti-lock control method according to claim 1, wherein a lower vehicle speed and a higher vehicle speed are set on the basis of an estimated vehicle speed obtained from said lower wheel speed and, when a difference between said higher wheel speed and said estimated vehicle speed obtained from said lower wheel speed is smaller than said predetermined value, said lower vehicle speed is used for anti-lock control whereas when said difference is larger than said predetermined value, said higher vehicle speed is used for anti-lock control.

5. An anti-lock control method according to claim 1, wherein a first estimated vehicle speed is set from said lower wheel speed and a second estimated vehicle speed is set from said higher wheel speed and, when a difference between said first and second estimated vehicle speeds is smaller than said predetermined value, said first estimated vehicle speed is used for anti-lock control whereas when said difference is larger than said predetermined value, said second estimated vehicle speed is used for anti-lock control.

* * * * *